April 22, 1958   R. ANDRIEU   2,832,003
COMPENSATED SWEEP CIRCUIT
Filed Feb. 10, 1956   2 Sheets-Sheet 1

Inventor:
Robert Andrieu
Patent Agent

April 22, 1958 R. ANDRIEU 2,832,003
COMPENSATED SWEEP CIRCUIT
Filed Feb. 10, 1956 2 Sheets-Sheet 2

Inventor:
Robert Andrieu
Patent Agent

United States Patent Office 2,832,003
Patented Apr. 22, 1958

2,832,003

COMPENSATED SWEEP CIRCUIT

Robert Andrieu, Hannover, Germany, assignor to Telefunken G. m. b. H., Berlin, Germany Application February 10, 1956, Serial No. 564,803

Claims priority, application Germany February 16, 1955

8 Claims. (Cl. 315—27)

The present invention relates to a circuit arrangement to produce a sawtooth-shaped current in an inductance whereby, during the forward sweep of the sawtooth, a voltage present across a condenser is applied to the inductance via a switching diode. During the return sweep of the sawtooth, when the switching diode has cut off, the inductance with the capacities connected thereacross carries out a half-cycle oscillation, whereby a control or driver tube is connected to the inductance to take care of the energy losses of the circuit and of the control of the switching diode. Such circuits have been used in various forms for the horizontal sweep or deflection, whereby the mentioned inductance is represented by a transformer to which the deflecting coils are coupled. A D. C. voltage of 12 to 20 kilovolts is generated by the high voltage peaks occurring during the return sweep, mostly with the aid of a rectifier connected to a special coil of the transformer, said D. C. voltage being used as the accelerating high voltage for the picture tube of a television receiver.

If a pentode is used as a control tube, which is operated in the range of high internal resistance, care has to be taken in such circuit arrangements that the shape and the amplitude of the sawtooth control voltage are precisely matched to a particular tube's characteristic. This leads to considerable difficulties when tubes are exchanged. The average tube current of the pentode is independent of the anode voltage in the range of high internal resistance, whereby, due to the considerable differences between individual tube characteristics, the average tube current may vary to a great extent when tubes are exchanged or replaced. Therefore, the controlling sawtooth voltage has to be precisely matched or adjusted in each individual case to the tube, so that the proper current curve characteristic is obtained. The different tolerances of the tubes with respect to anode current amount to ±25% if uniform test conditions are present. If the circuit is adjusted for an average tube, by suitably selecting the circuit elements and by controlling the sawtooth shape, so as to obtain the desired current characteristic, a much smaller current will flow in a tube with lower anode characteristic. On the other hand, a tube with an anode characteristic above average will operate in the saturation range, whereas the first mentioned tube with average anode characteristic would be operating with low current flow.

A further development led to circuit arrangements in which the control tube was operated in the saturation range. This operation has several advantages, because the shape of the controlling sawtooth voltage is unimportant and also the output amplitude of the circuit is independent within certain limits of the tube characteristic deviations. However, operation in the saturation range, i. e., with low internal resistance of the control tube, has the disadvantage that the tube tends to initiate Barkhausen-Kurtz oscillations which will cause disturbances on the picture screen. The anode voltage of the control tube is sometimes so low when operating in the saturation range that the electrons in the space between screen grid and anode are stopped and returned to the screen grid. This results in space charges which may oscillate in the frequency range between 20 and 1200 megacycles, whereby the frequency is primarily dependent upon the electrode voltage. These oscillations are radiated from the tube and can be received by the receiver input. Since the frequency depends upon the instantaneous anode voltage and since the anode voltage varies during a sweep, such oscillations, which lie within the receiver frequency range, always occur at a definite instant with respect to the beginning of the sweep and, therefore, are noticeable as vertical lines in the television picture. Consequently, operating in the current saturation range should be avoided and the aforementioned disadvantages of operation within the range of high internal resistance should be overcome in another manner.

It is an object of the present invention to make possible operation of the control tube within the range of high internal resistance by deriving a direct current voltage from the voltage present across the inductance of the transformer during the sawtooth return sweep and to supply this direct current voltage to the control tube as compensating bias voltage in such a manner that the average current of the control tube is increased when the voltage across the inductance decreases. As a result of this, it is possible to operate the control tube in the range of high internal resistance to avoid Barkhausen-Kurtz oscillations, so that the deflection amplitude is stabilized and the high voltage source has a small internal resistance. The negative compensating bias voltage at the control tube has the effect that the control voltage source for the control tube, as represented by a blocking oscillator, is charged no longer by the grid current of the control tube. Thus, no undesired distortions of the deflection current are obtained which, otherwise, would occur at the end of the forward sweep of the sawtooth.

These and other objects and advantageous features of this invention will be apparent from the following detailed description and drawings, appended thereto, wherein merely for the purpose of disclosure non-limitative embodiments of the invention are set forth.

Figure 1:
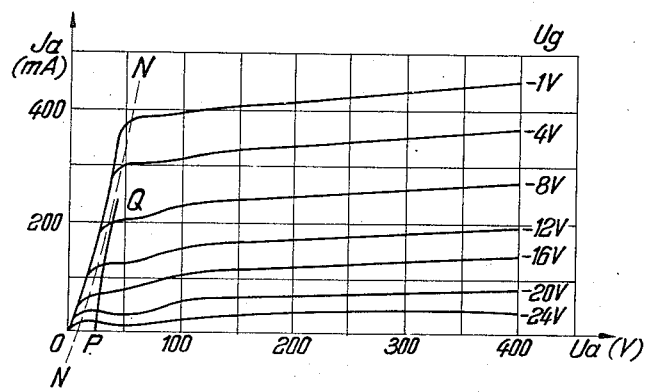
Figure 1 is a diagram illustrating the characteristics of a control tube for the linear sweep in television receivers.

With reference to Figure 1, the characteristics shown in this diagram are those of a control tube of the pentode type, such as PL 81. The individual curves show anode current $Ja$ as a function of anode voltage $Ua$ for various grid bias voltages $Ug$ indicated in the diagram. The current saturation range is left of the dotted line N—N. In this range, the control tube has a low internal resistance. Heretofore, the control tube has been operated within this range, because it is then independent of tube characteristic deviations. According to the invention, the voltage is stabilized at the transformer in such a manner, that the tube operates with a control characteristic P—Q of the anode voltage which lies within the range of high internal resistance, i. e., to the right of the line N—N. To obtain good efficiency of operation of the tube, the control characteristic line P—Q should be as close as possible to the line N—N, i. e., at anode voltages as low as possible.

Figure 2:
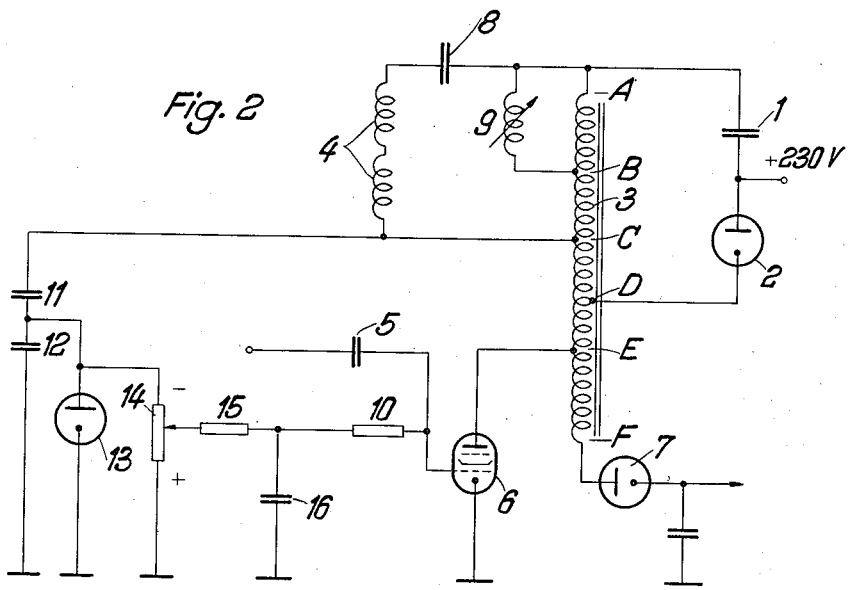
Figure 2 is a schematic circuit diagram of a so-called Blumlein circuit for the sweep in television receivers.

The circuit diagram of Figure 2 shows the so-called Blumlein circuit for sweep deflection in television receivers. An "approximately constant" voltage is applied across a part of the winding of the transformer 3 between the points A and D by means of a condenser 1 and via the switching diode 2 which is conductive during the forward sweep of the saw-tooth. This "approximately constant" voltage is transmitted to the deflection coils 4 by the transformer 3, said coils being on one side connected to the point A via a condenser 8, said point carrying practically no alternating voltage, and on the other side, to a tap C on the transformer carrying a higher alternating voltage. "Approximately constant" voltage, as mentioned in the foregoing, is to be understood to mean a constant D. C. voltage to which, if necessary, a voltage component similar to a parabola is superimposed to compensate for socalled tangential errors occurring in cathode ray tubes with flat screens. By suitably dimensioning the condensers 1 and 8, the voltage characteristic at the deflection coils 4 is a portion of a sine wave during the forward sweep, so that, if the portion of this sine wave is suitably selected, a proper deviation from the "constant" voltage can be adjusted to compensate for tangential errors.

The energy losses of the circuit are supplied by the control tube 6 during the sawtooth forward sweep, said tube being connected to a point E on the transformer 3. In this case, the tube 6 is intended to furnish such a current that the switching diode 2 is conductive during the entire forward sweep. The tube 6 is always cut off at the end of a sawtooth forward sweep by a blanking voltage synchronized with the received synchronizing impulses, said blanking voltage being generated, for example, by a blocking oscillator (not shown) and fed with negative voltage peaks to the grid of the tube 6 via a condenser 5. As a result of this, the switching diode 2 is instantly cut off. The deflection coil 4 with the connected transformer 3 and the switching capacities thereacross carries out a half-cycle oscillation through the diode 2 and the latter becoming nonconductive after completion of the half-cycle oscillation. Thus, the "approximately constant" voltage is again applied to the deflection coils 4, so that the sawtooth forward sweep starts anew. The voltage peaks occurring during the sawtooth return sweep are stepped up to higher voltages in the portion of the winding of the transformer 3 lying between the points E and F and the voltages thus obtained are fed to a rectifier 7 in which they serve to generate a high voltage of, for example, 12 to 15 kilovolts for the beam acceleration in the picture tube. The anode voltage source for the control tube 6 is connected to the junction of the condenser 1 with the anode of the diode 2 in a manner known per se. A variable parallel inductance 9 is inserted between the points A and B of the transformer 3 to control the deflection current amplitude in the deflection coils 4. In place of this, any other amplitude control means, for example, an inductance inserted in series with the deflection coils 4, or a variable resistance, may be employed.

The circuit arrangement described in the foregoing has been well known. The energy loss $Nv$ of this circuit is proportional to the square of a voltage present across a part of the winding of the transformer during the sawtooth forward sweep, for example, to the voltage U between the points D and E, thus: $Nv=K.U^2$, wherein K is a constant given by the losses. This energy loss is supplied by the tube 6. The energy $N_R$ supplied equals the product of the voltage U, and the average tube current $I_{Rm}$. Since in the compensated condition $Nv$ equals $N_R$, $K.U^2=I_{Rm}$ or $$U=\frac{I_{Rm}}{K}$$

When K is changed, for example, by changing the deflection current amplitude at the inductance 9, or by changing the load of the high voltage rectifier tube 7 during the picture brightness changes, $I_{Rm}$ will be changed in the same direction if U has to be kept constant.

In accordance with the invention, the changes of U are compensated by applying to the grid of the tube 6 via a resistance 10 a bias voltage depending upon the return sweep amplitude. For this purpose, the anode of a rectifier 13, having a grounded cathode, is connected to a suitable tap on the transformer 3, for example, to the point C of the deflection coils 4 via a capacitive voltage divider comprising condensers 11 and 12. An operating resistance 14 is inserted between the anode of the rectifier 13 and ground. The D. C. voltage obtained across this resistance will be proportional to the peak amplitude of the return sweep voltage. This is indicated by the plus and minus signs at the resistance 14, shown in Figure 2. As resistance 14 a potentiometer can be used, at the tap point of which the bias voltage for the tube 6 is taken off via a filter network comprising a resistance 15 and a condenser 16. If the voltage U between the points D and E of the transformer 3 is decreased by increasing the losses, the amplitude of the return sweep voltage peaks is also decreased and, thereby, the negative bias voltage of the tube 6 present across the potentiometer 14, so that the average tube current $I_{Rm}$ is increased in increased compensating direction. To improve the control sensitivity, i. e., the dependence of the bias voltage on the load variations, a positive bias voltage source (not shown) may be inserted in the cathode lead to the diode 13.

Figure 3:
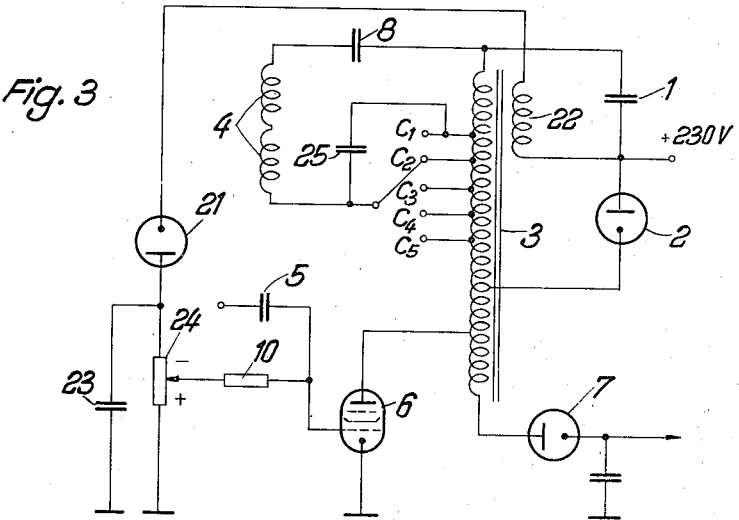
Figure 3 is a schematic circuit diagram of another embodiment of the invention, similar to the basic diagram shown in Figure 2.

Figure 3 shows another embodiment of this invention in which the elements of the basic circuit, shown in Figure 2, are denoted by like reference characters. In order to control the deflection amplitude, it is possible to change the number of turns of the winding tapped on the transformer 3 by the deflection coil 4 by means of a plurality of selectable tap points $C_1$, $C_2$, $C_3$, $C_4$ and $C_5$. A condenser 25 is inserted between the variable tap selector and $C_1$, so as to keep the return sweep interval constant when the tap is changed.

The cathode of the diode 21, serving to produce the control bias voltage on the tube 6, is connected to a special winding 22 of the transformer, said winding being separate from the main winding, so far as D. C. voltage is concerned, the other end of this winding being connected to a battery of, for example, 230 volts. The positive bias voltage obtained thereby blocks the diode 21 for all negative voltage peaks which are smaller than the battery voltage. Voltage impulses are induced in the winding 22 by the return sweep voltage peaks and are rectified in the diode 21 at an amplitude equal to the amplitude by which the impulses exceed the battery voltage. As a result of this, a negative voltage is obtained across the anode resistance 24 shunted by the condenser 23, said negative voltage being proportional to the mentioned voltage difference and being supplied as bias voltage to the grid of the tube 6 via the resistance 10. Also, in this case, it is advantageous to design the resistance 24, as shown, as a potentiometer so that the bias voltage can be varied or adjusted.

The invention makes it possible to operate the control tube in the range of high internal resistance without the the risk that Barkhausen-Kurtz oscillations will occur in the tube. In spite of the high internal resistance of the control tube, a high voltage source with low internal resistance can be used at the output of the high voltage rectifier 7, because each change in the load of the high voltage source caused by the variable beam currents of the picture tube will be compensated by the bias voltage on the control tube changing at the same time.

It is believed that the efficiency of the control tube will be unfavorable with such circuit arrangements if one operates in a range of the characteristic in which no grid current is flowing. It appears to be obvious that the control tube should be operated without flow of grid current to avoid a variable load on the control voltage source, due to the variable grid current occurring during various stages of tube operation. Such variable load reacts on the blocking oscillators or multi-vibrators generally employed in television receivers as control voltage sources, the frequency of said sources being kept constant by a phase compensating circuit arrangement, whereby phase shifting of the sawtooth voltage controlling the control tube occurs. As a result of this, a lateral shifting of the image in the reproduced television picture would occur in dependence on the picture brightness. In accordance with the invention, the average grid bias voltage of the control tube is suitably selected in such a manner, that the grid can be controlled by the control alternating current up to the neighborhood of zero, whereat a grid current would flow in the control tube 6 in the case of great brightness of the picture. In this case, the control tube has to be controlled by a control generator, the frequency and phase of which are independent of the load changing due to grid current flow in the control tube. A cathode-coupled blocking oscillator is particularly suited for this purpose. Such operation of the circuit arrangement has the advantage that the ratio of screen grid current to anode current remains small. In addition to this, the slope of the control tube characteristic in case of such operation is greatest, which is advantageous with respect to the control sensitivity of this circuit arrangement.

Although, in accordance with the provisions of the patent statutes, this invention is described as embodied in concrete forms and the principle of the invention has been explained together with the best modes in which it is now contemplated applying that principle, it will be understood that the elements, circuits and combinations shown and described are merely illustrative and that the invention is not limited thereto, since alterations and modifications will readily suggest themselves to persons skilled in the art without departing from the true spirit of the present invention or from the scope of the annexed claims.

I claim:

1. In a circuit for producing a sawtooth current in a coil, said circuit including an inductive-capacitive oscillatory path interposed between a source of D. C. power and a control tube having a grounded electrode, and the inductive portion of the path being a multi-tapped inductance, said coil being connected to taps of the inductance and said control tube being pulsed to alter its conductivity and thus alter the flow of current through said path; a circuit for applying to said control tube a corrective bias voltage intended to compensate for energy losses in said oscillatory path, comprising a voltage connection at said inductance; rectifier means connected to said connection to develop a bias voltage from oscillatory voltage received from said inductance, the rectifier means being connected to said control tube to supply thereto bias voltage of such polarity as to increase the control tube conductivity as the oscillatory voltage decreases.

2. In a circuit as set forth in claim 1, said rectifier means including a filter circuit for smoothing said bias voltage applied to said control tube.

3. In a circuit as set forth in claim 1, said control tube including a grid and said bias comprising a negative voltage applied to said grid.

4. In a circuit as set forth in claim 3, said control tube being operated with its grid biased negative to permit operation of the tube in the high-internal-resistance portion of its characteristic, and the grid approaching zero bias when the tube is pulsed.

5. In a circuit as set forth in claim 3, said voltage connection being a capacitive voltage divider to ground applying to said rectifier means voltage peaks proportional to the amplitude of the return portion of said sawtooth, the rectifier means comprising a rectifier to cut-off positive peaks, and a potentiometer across the output of said rectifier means to control the amplitude of the bias.

6. In a circuit as set forth in claim 3, said multi-tapped inductance being one winding of a transformer and said voltage connection being a second winding on the transformer and connected at one end to said D. C. source of positive voltage and at the other end to said rectifier means, the latter comprising a diode having its cathode connected to said second winding and having its anode connected to a potentiometer to ground, the tap on the potentiometer being connected to said grid.

7. In a circuit as set forth in claim 6, a threshold applied to said rectifier for limiting the minimum negative amplitude that will render the rectifier conductive, the threshold being equal to the absolute value of the voltage at said D. C. source.

8. In a circuit as set forth in claim 1, said coil being the deflection coil of a cathode ray tube sweep circuit, and said inductance comprising an autotransformer adapted to step up the sawtooth voltage; and a second rectifier receiving said stepped up voltage and converting it into a D. C. potential sufficient to be used to accelerate the cathode-ray beam.

References Cited in the file of this patent

UNITED STATES PATENTS

| | | |
|---|---|---|
| 2,712,092 | Schwarz | June 28, 1955 |
| 2,712,616 | Leeds | July 5, 1955 |
| 2,743,382 | Lufkin | Apr. 24, 1956 |